United States Patent
Ichihara

[11] Patent Number: 6,046,794
[45] Date of Patent: *Apr. 4, 2000

[54] CONTROL DEVICE FOR MARKING DEVICE

[75] Inventor: Masashi Ichihara, Hiratsuka, Japan

[73] Assignee: Kabushiki Kaisha Komatsu Seisakusho, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/530,205

[22] PCT Filed: Jan. 30, 1995

[86] PCT No.: PCT/JP95/00112

§ 371 Date: Sep. 28, 1995

§ 102(e) Date: Sep. 28, 1995

[87] PCT Pub. No.: WO95/20457

PCT Pub. Date: Aug. 3, 1995

[30] Foreign Application Priority Data

Jan. 28, 1994 [JP] Japan .................................. 6-008659

[51] Int. Cl.⁷ .................................................. G03B 27/62
[52] U.S. Cl. .................................. 355/75; 355/40; 355/77
[58] Field of Search ................................... 355/40, 75, 77

[56] References Cited

U.S. PATENT DOCUMENTS

| | | | |
|---|---|---|---|
| 4,694,354 | 9/1987 | Tanaka et al. | 358/296 |
| 4,908,657 | 3/1990 | Kogane | 355/75 |
| 4,918,483 | 4/1990 | Otake | 355/40 |
| 4,959,683 | 9/1990 | Otake et al. | 355/28 |
| 4,963,919 | 10/1990 | Matsumoto et al. | 355/40 |
| 5,113,213 | 5/1992 | Sandor et al. | 355/22 |
| 5,383,035 | 1/1995 | Suzuki | 358/500 |

*Primary Examiner*—Safet Metjahic
*Assistant Examiner*—John Chizmar
*Attorney, Agent, or Firm*—Diller, Ramik & Wight, PC

[57] ABSTRACT

A control device for reducing a marking time in a marking device. This control device performs control operations whereby an image 20 of an area that circumscribes the entire "ABCDE" pattern of an original image is retrieved, the circumscribed area image 20 is divided into a plurality of image segments 19 of a predetermined size, and each of the plurality of image segments 21 is sequentially displayed on a mask.

6 Claims, 16 Drawing Sheets

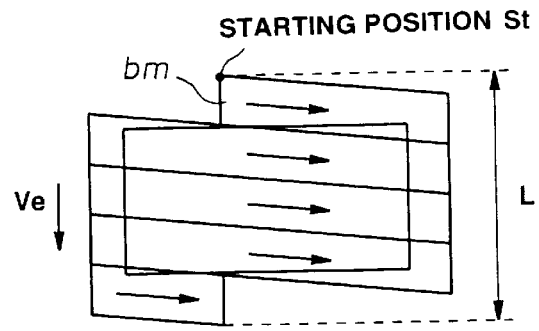
FIG.18
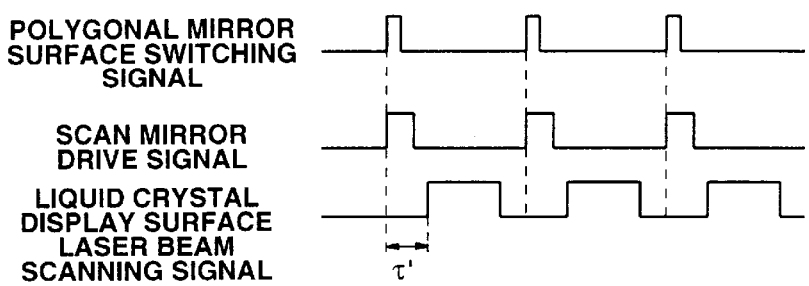
FIG.19(a) POLYGONAL MIRROR SURFACE SWITCHING SIGNAL
FIG.19(b) SCAN MIRROR DRIVE SIGNAL
FIG.19(c) LIQUID CRYSTAL DISPLAY SURFACE LASER BEAM SCANNING SIGNAL
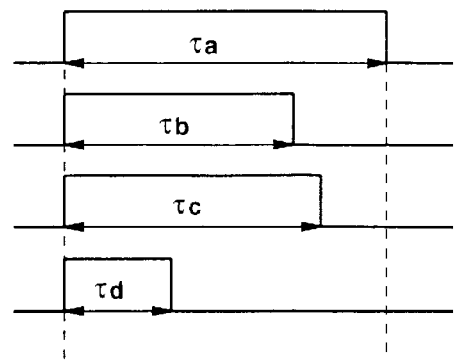
FIG.20(a) LIQUID CRYSTAL MASK DISPLAY SWITCH
FIG.20(b) X DIRECTION SHIFTING
FIG.20(c) Y DIRECTION SHIFTING
FIG.20(d) SUB SCANNING PREPARATION

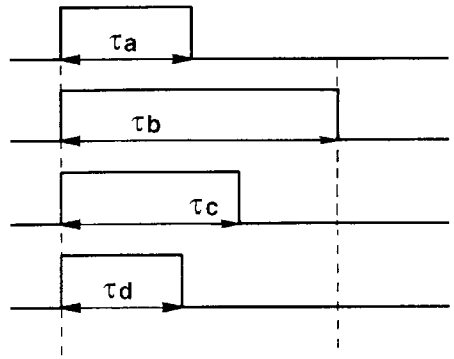
FIG.21(a) LIQUID CRYSTAL MASK DISPLAY SWITCH
FIG.21(b) X DIRECTION SHIFTING
FIG.21(c) Y DIRECTION SHIFTING
FIG.21(d) SUB SCANNING PREPARATION
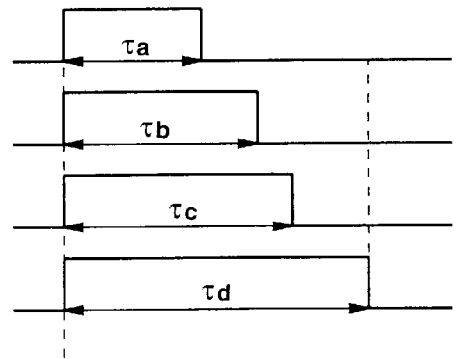
FIG.22(a) LIQUID CRYSTAL MASK DISPLAY SWITCH
FIG.22(b) X DIRECTION SHIFTING
FIG.22(c) Y DIRECTION SHIFTING
FIG.22(d) SUB SCANNING PREPARATION

CONTROL DEVICE FOR MARKING DEVICE

TECHNICAL FIELD

The present invention relates to a device for controlling a marking device designed to mark a predetermined pattern on a work, and in particular relates to a control device capable of performing high-speed marking.

BACKGROUND ART

A need for reducing the marking time has recently arisen in the technical field related to marking devices, including laser markers.

In the past, to mark an "ABCDE" marking pattern such as that shown in FIG. 2 using the laser marker shown in FIG. 1, an entire original image 18 was uniformly divided into image segments 19 of a predetermined size, all these image segments 19 were sequentially displayed on the display screen 10 of a liquid-crystal mask 6, and actuators 12 and 16 for switching an image-segment exposure position 17a on a work 17 were driven in controlled fashion every time the display was switched.

In such cases, display switches and actuator drive/control are also performed for image segments 19', which represent only the background outside of the "ABCDE" marking pattern. This means that so-called blank spaces are also marked, and the time for display switches and the like is wasted. The same is true for images such as an image segment 19", where the marking pattern occupies only a small share of the entire image 19".

A first object of the present invention, which was devised in view of this situation, is to reduce the marking time by reducing the number of divisions when an original image is divided into image segments.

In the laser marker shown in FIG. 1, a laser beam ba strikes the display screen 10 of the liquid-crystal mask 6, and the entire display screen 10 is marked by scanning the laser beam, as shown in FIG. 16. Main scanning of the display screen 10 in the X direction is effected by the rotation of a polygonal mirror 3, and sub scanning in the Y direction is effected by the rotation of a scanning mirror 2.

In the past, to continue to perform main scanning once the preceding cycle of main scanning had been completed, it was necessary to vary the rotational speed of the scanning mirror 2 in steps from zero speed and to proceed from an initial sub scanning position Y1 to a next sub scanning position Y2.

Such a stepwise scanning mode does not pose any problems when the polygonal mirror 3 rotates at a low speed and the main scanning is performed at a low speed, but it is impossible to track when the main scanning is performed at a fast speed, and undesirable vibration results.

A second object of the present invention, which was devised in view of this situation, is to reduce the marking time by raising the scanning speed of the display screen of the mask without impairing the tracking properties or bringing about other disadvantages.

When an image such as that shown in FIG. 24 is marked with the aid of the laser marker shown in FIG. 1, then, as described above, an image 33 is divided into the image segments 19 of the predetermined size, these image segments 19 are sequentially displayed on the display screen 10 of a liquid-crystal mask 6, and actuators 12 and 16 for switching an image-segment exposure position 17a on a work 17 are driven in controlled fashion every time the display is switched.

The dimensions of the image 33 and image segments 19 often vary with the type of device and correspond to rectangular shapes with varying longitudinal and transverse dimensions.

In the past, the display switching sequence for image segments 19 was unconditionally defined as a sequence involving a large number of travel cycles in the transverse direction, as shown, for example, in FIG. 24, so it was necessary to move the image-segment exposure position 17a over long distances along the work 17 with the aid of the actuators 12 and 16 every time the display was switched for an image segment with a large size in the transverse direction. This meant an extended marking time.

A third object of the present invention, which was devised in view of this situation, is to reduce the marking time by selecting an optimum display switching sequence that corresponds to the image size, that is, to the duration of movement in the X and Y directions across the work 17.

Conventionally, as shown in FIG. 26(a), raster scanning such as that shown by the arrow is performed on the display screen 10 of the liquid-crystal mask 6, but the scanning mirror 2 is driven in such a way that a return to a predetermined sub scanning starting position St is effected every time an image segment is switched, and scanning always starts from the starting position St.

It should be noted that the preparation time needed to start such sub scanning is a dead time that produces no actual scanning or marking, and this must be reduced in order to reduce the marking time.

A fourth object of the present invention, which was devised in view of this situation, is to reduce the marking time by reducing the preparation time of sub scanning.

As is also shown in FIGS. 28 and 29, when the object is to mark two images 34 and 35 on the same work 17, the total distance over which the image-segment exposure position 17a is moved by the actuators 12 and 16 across the work 17 sometimes varies depending on whether the display of image segments 19 is alternated between the two images (FIG. 28) or whether the display of the image segments 19 of one of the two images is started after the display of all the image segments 19 of the other one image have been completed (FIG. 29). The result is that movement over long distances across the work 17 is sometimes inevitable when the actuators 12 and 16 are driven in accordance with an unconditionally defined display switching sequence, and this is undesirable if the marking time is to be reduced.

A fifth object of the present invention, which was devised in view of this situation, is to reduce the marking time by selecting an optimum display switching sequence.

Thus, a common object of the present invention is to provide a control device capable of reducing the marking time in a marking device.

DISCLOSURE OF THE INVENTION

In view of the above, the essence of the first invention of the present invention is a control device of a marking device in which an original image indicative of a pattern to be marked is divided into a plurality of image segments of a predetermined size, each of the plurality of image segments is sequentially displayed on a liquid-crystal mask, and the display surface of the mask is exposed to light, thereby guiding the light passing through the mask toward a work and marking the pattern on the work, wherein an image of the area that circumscribe the entire pattern is retrieved from the original image, the circumscribed area image is divided into a plurality of image segments of the predetermined size, and each of the plurality of image segments is then sequentially displayed on the mask.

The essence of the second invention of the present invention is a control device of a marking device which is provided with a scanning device for exposing the display screen of a mask to light and subjecting the exposure light both to main scanning at a predetermined speed in the X direction across the display screen and to sub scanning at a predetermined speed in the Y direction that is perpendicular to the X direction, and in which an image indicative of a pattern to be marked is displayed on the display screen of the mask, and the light is scanned by the scanning device, thereby guiding the light passing through the mask toward a work and marking the pattern on the work, wherein the scanning device is controlled in such a way that the sub scanning is performed at a constant speed during the sub scanning of the display screen of the mask.

The essence of the third invention of the present invention is a control device of a marking device which comprises a display switching device for dividing an original image indicative of a pattern to be marked into a plurality of image segments of a predetermined size and sequentially displaying each of the plurality of image segments on a mask, a scanning device for exposing the display screen of the mask to light and subjecting the exposure light both to main scanning at a predetermined speed in the X direction across the display screen and to sub scanning at a predetermined speed in the Y direction that is perpendicular to the X direction; and drive devices for shifting in the X direction and the Y direction the exposure position that the light passing through the mask occupies on the work, so that the pattern of the image segment displayed on the mask is marked in the corresponding area of the work, and which is designed to mark the pattern of the original image on the work by controlling the display switching device, the scanning device, and the drive devices, wherein the drive devices are controlled in such a way that the display switching sequence of the image segments is determined so that cycles of travel in a travel direction characterized by an extended travel time between the travel time in the X direction and the travel time in the Y direction of the exposure position shifted by the drive devices become minimum, the scanning device is controlled in such a way that the image segments are switched in accordance with the determined display switching sequence, and the drive devices are controlled so that the exposure position is shifted in accordance with the determined display switching sequence.

The essence of the fourth invention of the present invention is the control device of the third invention in which the scanning device is controlled in such a way that the subsequent cycle of scanning for the display screen to be scanned is started from the sub-scanning position at a time point when the entire scanning of one screen has been completed by the scanning device.

The essence of the fifth invention of the present invention is the control device of the third invention, wherein in the event that the pattern is separated into upper and lower sections or left and right sections on the original image, images of areas that circumscribe the pattern sections are retrieved from the original image for each pattern section, and the circumscribed area images are divided into a plurality of images of the predetermined size, a comparison is made between the time needed for the drive devices to shift the exposure position when the displays are switched in accordance with a first switching sequence, in which the display of all the image segments of a circumscribed area image corresponding to a second pattern section is switched after the display of all the image segments of a circumscribed area image corresponding to a first pattern section have been switched, and the time needed for the drive devices to shift the exposure position when the display is switched in accordance with a second switching sequence, in which at least two display switching cycles are alternated between the image segments of the circumscribed area image corresponding to the first pattern section and the image segments of the circumscribed area image corresponding to the second pattern section, and as a result of the comparison, the display switching device is controlled in such a way that the display of the image segments is switched in accordance with a sequence characterized by a shorter exposure position travel time, and the drive devices are controlled in such a way that the exposure position is shifted in accordance with the switching sequence.

The aforementioned first invention involves, as shown in FIGS. 2 through 4, retrieving from an original image 18 the image 20 of an area that circumscribes an entire "ABCDE" pattern, dividing this circumscribed area image 20 into a plurality of images 19 of predetermined size, and sequentially displaying each of the plurality of these image segments 21 on a mask 6 (see FIG. 1). The number of divisions involved in dividing the original image into image segments can thus be lowered, and the marking time is reduced.

The aforementioned second invention involves performing sub scanning at a constant speed during the sub scanning of the display screen 10 of the mask 6, as shown in FIG. 15, making it possible to raise the scanning speed and reducing the marking time without adversely affecting tracking or causing other problems.

The aforementioned third invention involves determining the display switching sequence of the image segments 19 in such a way that cycles of travel in a travel direction X characterized by an extended travel time between the travel time τb in the X direction and the travel time τb in the Y direction of the exposure position 17a (see FIG. 1) shifted by drive devices 12 and 16 become minimum (two cycles), as shown in FIGS. 21 and 23, switching the image segments 19 in accordance with the determined display switching sequence, and shifting the exposure position 17a in accordance with the determined display switching sequence. The shortest display switching sequence is thus determined in accordance with the dimensions of the images 33 and 19, that is, in accordance with the values of the travel times τb and τc in X and Y directions across the work 17, and the marking time is reduced.

The aforementioned fourth invention involves, as shown in FIG. 26, a procedure in which the next cycle of scanning for the display screen 19b to be scanned is started from the sub-scanning position Ye reached the moment the entire scanning of one screen 19a has been completed by scanning devices 2, 3, etc. (see FIG. 1). The preparation time of the sub scanning is thus reduced, as is the marking time.

The aforementioned fifth invention involves a procedure wherein, as shown in FIGS. 28 and 29, in the event that a pattern is separated into upper and lower sections or left and right sections on the original image, images 34 and 35 of areas that circumscribe the pattern sections are retrieved from the original image for each pattern section, and the circumscribed area images 34 and 35 are divided into a plurality of images 19 of predetermined size. A comparison is then made between the time needed for drive devices 12 and 16 (see FIG. 1) to shift the exposure position 17a (see FIG. 1) when the display is switched in accordance with a first switching sequence (FIG. 29), in which the display of all the image segments 19 of a circumscribed area image 35 corresponding to a second pattern section is switched after the display of all the image segments 19 of a circumscribed area image 34 corresponding to a first pattern section has been switched, and the time needed for the drive devices 12 and 16 to shift the exposure position 17a when the display is switched in accordance with a second switching sequence (FIG. 28), in which at least two display switching cycles are alternated between the image segments 19 of the circumscribed area image 34 corresponding to the first pattern section and the image segments 19 of the circumscribed area image 35 corresponding to the second pattern section.

As a result, the display of the image segments 19 is switched in accordance with a sequence characterized by a shorter travel time of the exposure position 17a, and the exposure position 17a is shifted in accordance with the aforementioned switching sequence. The shortest display switching sequence is thus determined, and the marking time is reduced.

BRIEF DESCRIPTION OF THE DRAWINGS

FIG. 18 is a diagram used to describe the manner in which the sub-scanning speed is computed.

FIGS. 19(a) to 19(c) are timing charts illustrating the conventional scanning mode.

FIGS. 20(a) to 20(d) are time charts showing the required times for each of the procedures needed to switch the display screens of the liquid-crystal mask.

FIGS. 21(a) to 21(d) are time charts showing the required times for each of the procedures needed to switch the display screens of the liquid-crystal mask.

FIGS. 22(a) to 22(d) are time charts showing the required times for each of the procedures needed to switch the display screens of the liquid-crystal mask.

BEST MODE FOR CARRYING OUT THE INVENTION

Embodiments of the control device for a marking device pertaining to the present invention will now be described with reference to the accompanying figures.

Figure 1:
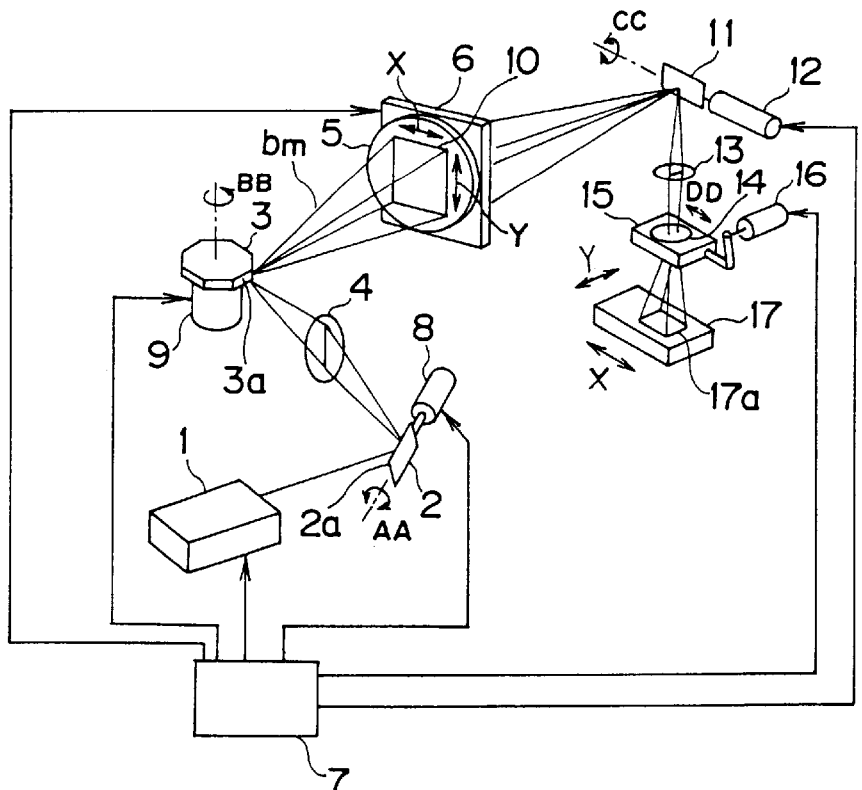
FIG. 1 is a perspective view outlining the structure of an embodiment of a marking device pertaining to the present invention.

FIG. 1 illustrates the concept of the entire structure of the laser marker pertaining to the embodiments.

In the figure, a laser oscillator 1 oscillates scanning laser beam (for example, YAG laser beam), and the oscillated laser beam strikes a reflecting surface 2a of a scanning mirror 2, which is a Y-direction deflector.

Laser light reflected by the reflecting surface 2a passes through a lens 4 and strikes a reflecting surface 3a of a polygonal mirror 3, which is an X-direction deflector. Laser light reflected by the reflecting surface 3a passes through a lens 5 and strikes, for example, a liquid-crystal display screen 10 of a macromolecular composite-type liquid-crystal mask 6.

Figure 15:
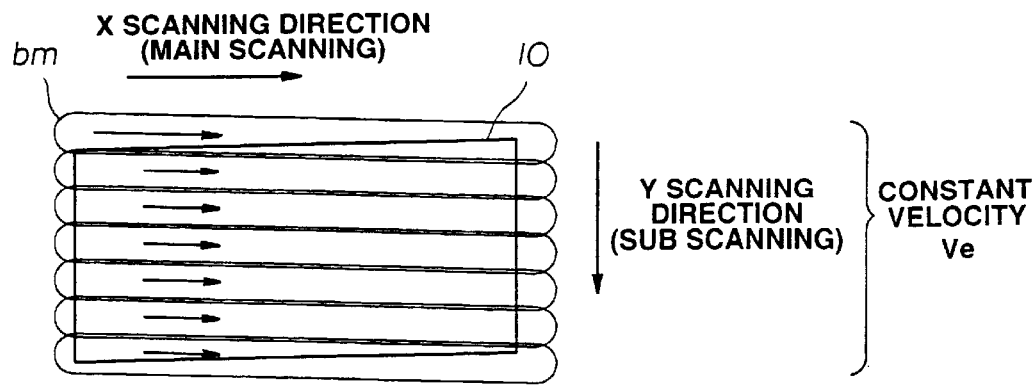
FIG. 15 is a diagram illustrating the manner in which the display screen of a liquid-crystal mask undergoes sub scanning at a constant speed.

Here, the reflecting surface 2a of the scanning mirror 2 is rotated in the direction of arrow AA by a motor 8, and the reflecting surface 3a of the polygonal mirror 3 is rotated in the direction of arrow BB by a motor 9. Therefore, laser light performs main scanning for the display screen 10 of the liquid-crystal mask 6 in the direction of the arrow X as a result of the fact that the motor 9 is driven in controlled fashion and the reflecting surface 3a is rotated in the direction of arrow BB, and the laser light performs sub scanning for the display screen 10 of the liquid-crystal mask 6 in the direction of the arrow (Y) as a result of the fact that the motor 8 is driven in controlled fashion and the reflecting surface 2a is rotated in the direction of arrow AA. The manner in which the laser beam bm scans the screen 10 is illustrated in FIG. 15 described later.

A controller 7 controls the scanning of laser light across the screen 10 of the liquid-crystal mask 6 by driving the motors 8 and 9 in controlled fashion and controlling the laser oscillation of the laser oscillator 1. The controller 7 controls display switching in such a way that an original image indicative of the marking pattern to be marked is divided into image segments of predetermined size, as described below, and these are sequentially displayed on the display screen 10.

Motors 12 and 16 are actuators for moving, in the X and Y directions, that position 17a on the work 17 which is to be exposed to the light transmitted through the mask 6, so that the pattern of image segments is marked in the corresponding area 17a of the work 17. The controller 7 drives the motors 12 and 16 in controlled fashion.

Specifically, data concerning an original image 18 indicative of, for example, the "ABCDE" marking pattern shown in FIG. 2 below are input with the aid of a predetermined input means such as a scanner, and the controller 7, once the dividing procedure described below has been performed, outputs drive signals for driving pixels of the liquid-crystal screen 10 in accordance with the pattern of the image segments 19 in such a way that the image segments 19 are displayed on the display screen 10 of the liquid-crystal mask 6. In this case, the pattern segments of "ABCDE" correspond to logical "1", and the background segments other than the pattern segments correspond to logical "0".

The motors 8 and 9 are then driven in controlled fashion, as is the laser oscillator 1, and scanning is performed with the aid of laser light, which passes only through the aforementioned driven pixel portion (logical "1" pixels).

Laser light transmitted through the liquid-crystal mask 6 passes through a reflecting mirror 11 which is a Y-direction deflector, a lens 13, a lens 14 which is an X-direction deflector and a movable table 15 whereon the lens 14 is mounted, strikes the corresponding area 17a of the work 17, and the pattern of image segments 19 is marked on the work 17. The reflecting surface of the reflecting mirror 11 is rotated in the direction of arrow CC by the motor 12, and the exposure position 17a on the work 17 is switched in the Y direction. The table 15 is moved in a reciprocated fashion in the direction of arrow DD by the motor 16, and the exposure position 17a of the work 17 is switched in the X direction.

Figure 2:
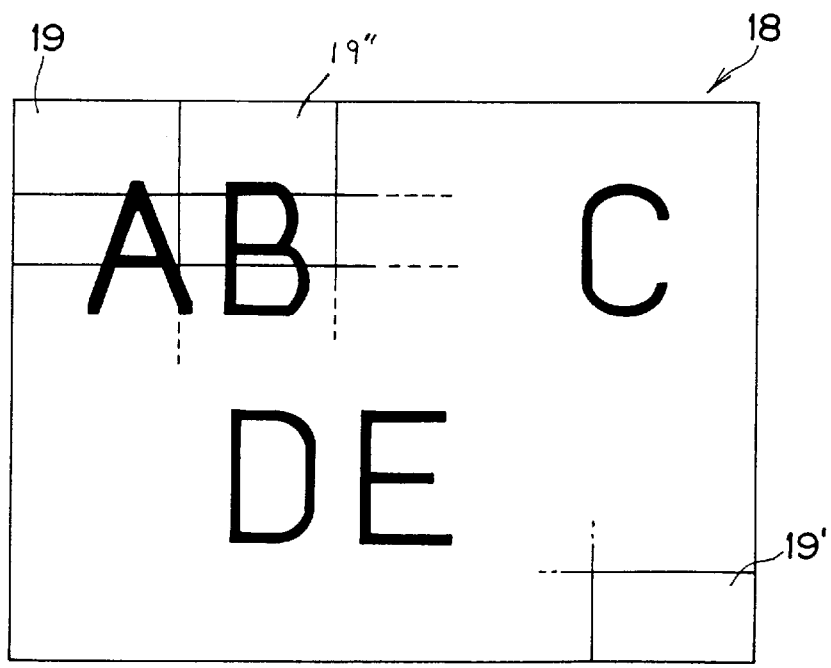
FIG. 2 is a diagram illustrating an original image of the entire marking pattern in the embodiment.

When one image segment 19 is being scanned, the motors 12 and 16 are not driven, and when another image segment 19 is displayed on the liquid-crystal mask 6, the motors 12 and 16 are driven in controlled fashion, and the reflecting mirror 11 and lens 14 move in such a way that the marking position 17a that corresponds to the next image segment is exposed to light. the image segments 19 of FIG. 2 are thus sequentially marked on the work 17, and the entire original image 18 is ultimately marked on the work 17.

The division of the entire original image does not pose any particular problems when the marking pattern fills up the original image, but when, as shown in FIG. 2, the proportion of the "ABCDE" marking pattern with respect to the original image 18 is low and the share of the blank background spaces is large, so-called blank spaces 19' are marked needlessly, the time needed to switch the display of the image segments 19 is wasted, as is the time needed to shift the exposure positions with the aid of the motors 12 and 16, and marking becomes time-consuming. In view of the above, these embodiments involve reducing the marking time by performing a dividing procedure such as that described below.

First Embodiment

Figure 3:
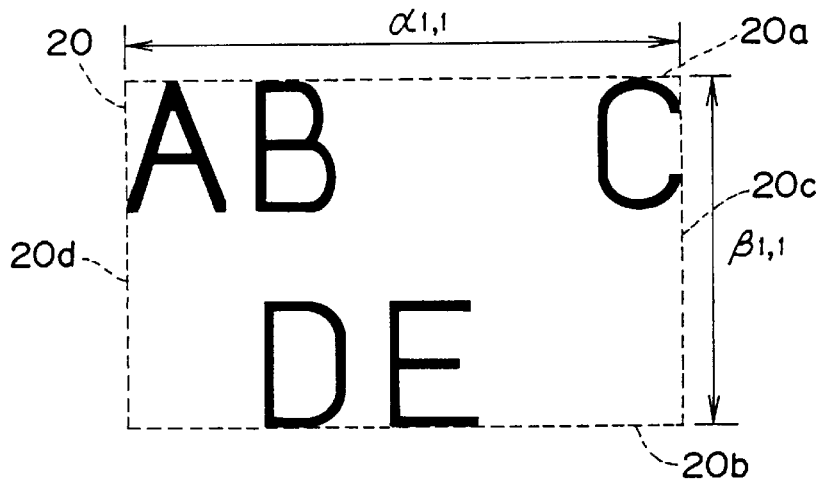
FIG. 3 is a diagram illustrating a rectangle that circumscribes the original image shown in FIG. 2.
Figure 14:
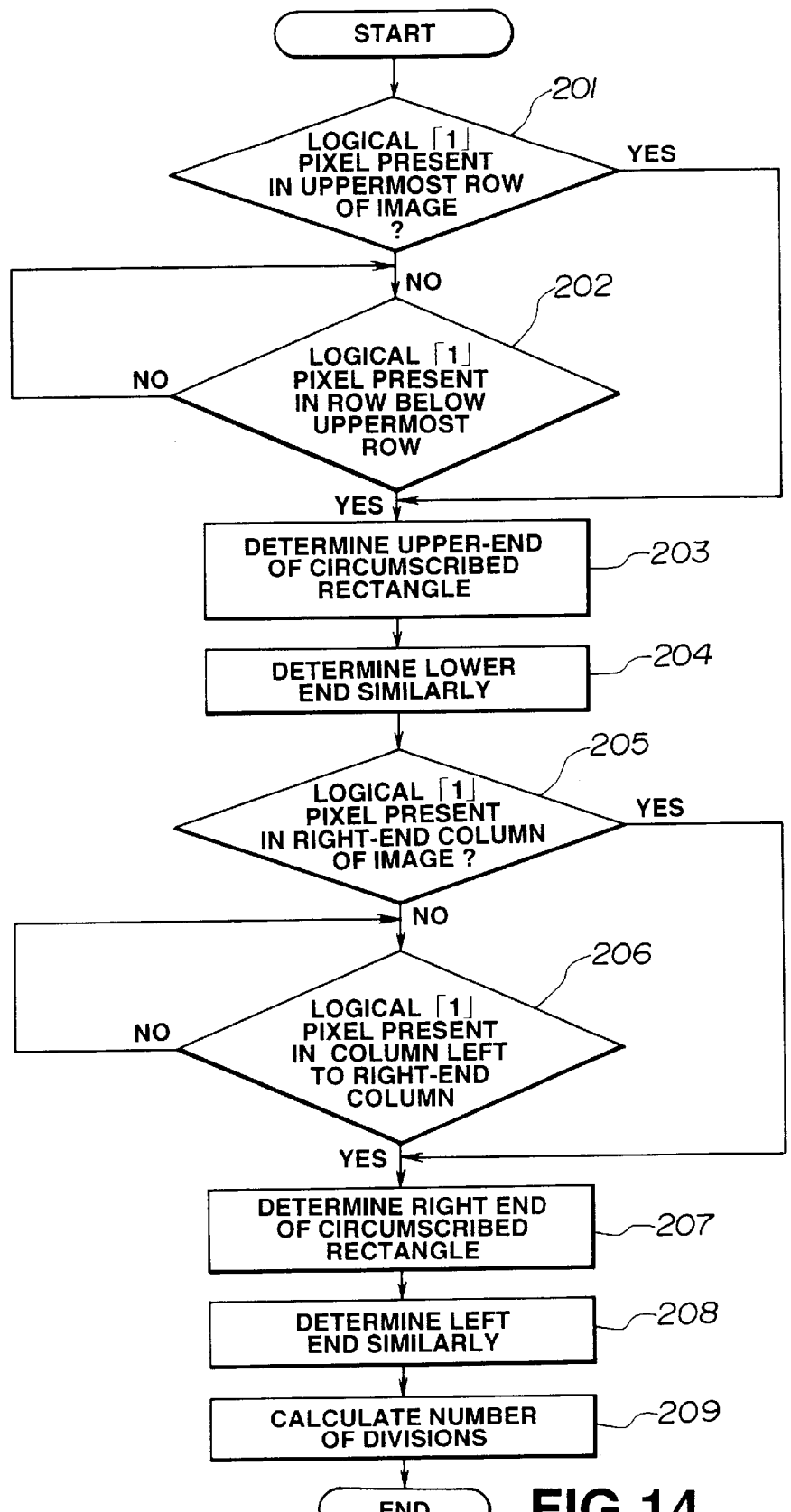
FIG. 14 is a flow chart illustrating a sequence for dividing the original image into image segments.

FIG. 14 illustrates a flow chart for the dividing procedure of the first embodiment. A description will be given below with reference to FIGS. 2 through 4.

Specifically, as shown in FIG. 14, it is first determined whether or not there is a logical "1" pixel in the uppermost row of the original image 18 (Step 201), and as long as there are only pixels that represent a logical "0" background rather than logical "1"s, the procedure is repeated for successive rows in the downward direction to determine in a similar manner whether there is a logical "1" pixel in each row (Step 202).

A line representing a logical "1" "ABCDE" marking pattern is eventually identified ("YES" in Step 202), and this results in the detection of the upper end 20a of a circumscribed rectangle that circumscribes the entire marking pattern (Step 203).

Once the upper end 20a is thus detected, the same search is performed until no more rows with logical "1" pixels are identified at all, and the lower end 20b of the circumscribed rectangle 20 is detected (Step 204).

The same search as that performed in Steps 201 and 202 above is subsequently carried out in the column direction starting from the right column (Steps 205 and 206), the right end 20c of the circumscribed rectangle 20 is detected (Step 207), and the left end 20d of the circumscribed rectangle 20 is detected in the same manner (Step 208).

Once the circumscribed rectangle 20 is thus defined, the images of this circumscribed rectangle 20 are divided into image segments 19.

The following method can, for example, be adopted for determining the number of divisions.

Figure 4:
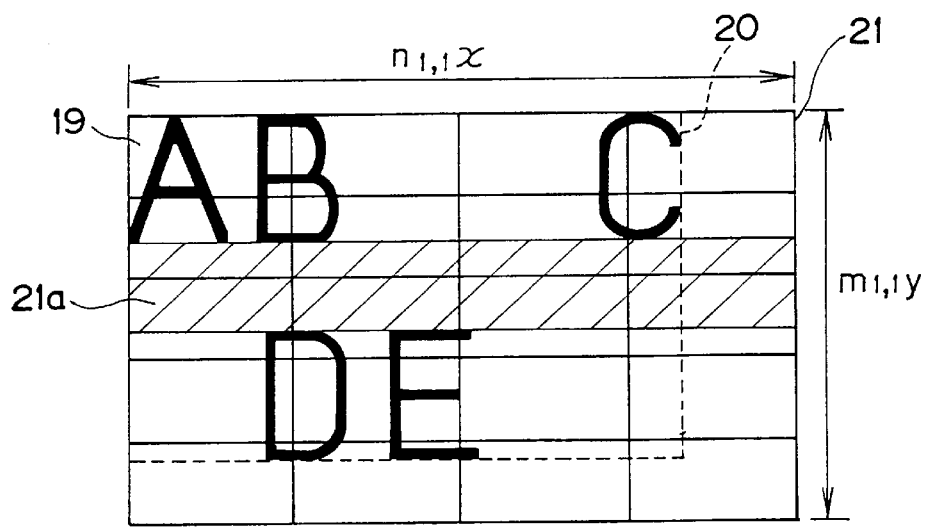
FIG. 4 is a diagram illustrating a circumscribed area image that conforms to the circumscribed rectangle of FIG. 3.
Figure 5:
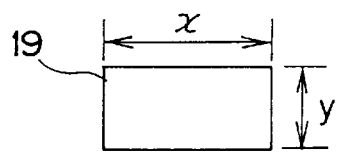
FIG. 5 is a diagram illustrating an image segment.

Specifically, division should be performed using the number of divisions $n1,1 \times m1,1$, which is determined by the minimum natural numbers $n1,1$ and $m1,1$ that satisfy the relations $$\alpha 1,1 \leq n1,1 \cdot x \quad \beta 1,1 \leq m1,1 \cdot y \tag{1}$$

where, as shown in FIG. 5, x and y are the transverse width and longitudinal width of an image segment 19, respectively, and $\alpha 1,1$ and $\beta 1,1$ are the transverse width and longitudinal width of the circumscribed rectangle 20, respectively (see FIG. 4).

With such images (hereinafter "circumscribed area images") 21, whose number is equal to the number of divisions $n1,1 \times m1,1$, the display of the image segments 19 on the liquid-crystal mask 6 is switched in a sequential manner, and the "ABCDE" marking pattern is marked on the work 17 (Step 209).

The first embodiment is thus aimed at allowing only the "ABCDE" marking pattern to be actually marked on the work 17, and involves forming an image in the form of a circumscribed rectangle that circumscribes the "ABCDE" marking pattern and switching the display of the image segments within this circumscribed-rectangle image, with the result that the required time for marking is markedly reduced because the number of divisions reduces the number of cycles needed to switch the display of the entire original image 18 in comparison with cases in which the display of these image segments is switched for the entire original image 18 including image segments of only blank portions.

Second Embodiment

The following is a description of an embodiment in which a reduction in the number of divisions brings about a further reduction in the number of display switchings.

The aforementioned embodiment is satisfactory when the marking pattern itself is an integrated design.

Generally, however, such designs almost always consist of manufacturer's logos and Latin letters when the object is to imprint the designs on works such as IC packages. A distinctive feature of a design made up of Latin letters is that there are spaces between the letters, so the design can be made into separate portions consisting of images divided by certain spaces in the vertical and horizontal directions, and the number of divisions can thus be further reduced by reducing the blank spaces.

Figure 12:
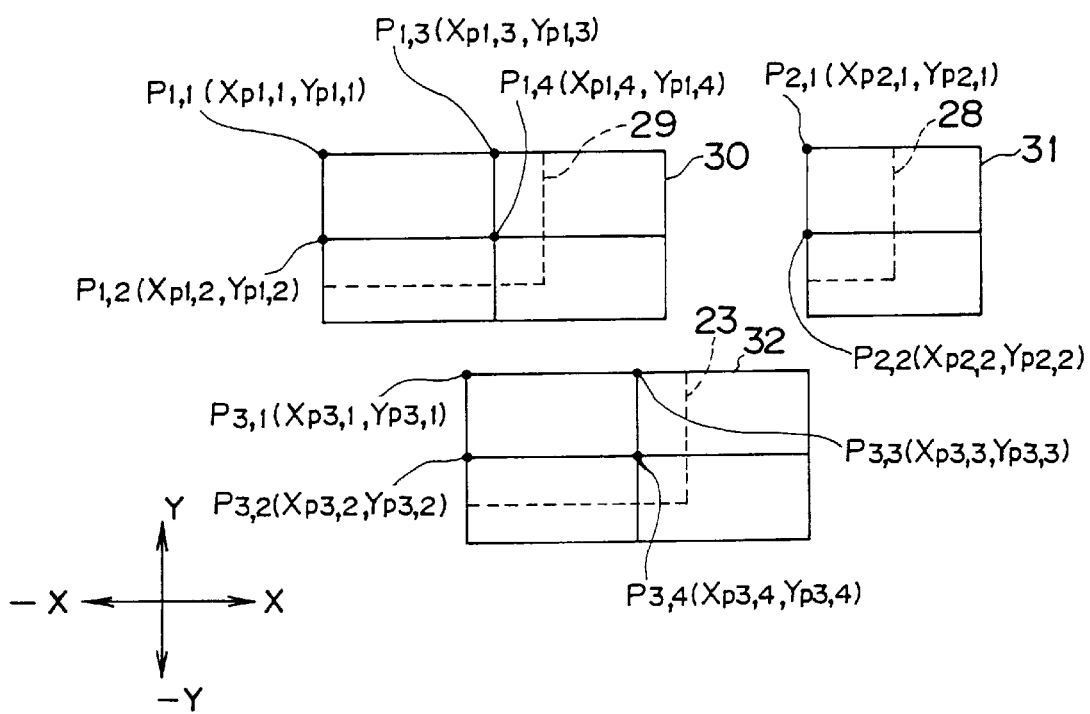
FIG. 12 is a diagram representing, with the aid of coordinate positions, the positional relationship of the circumscribed area images shown in FIG. 10.
Figure 13A:
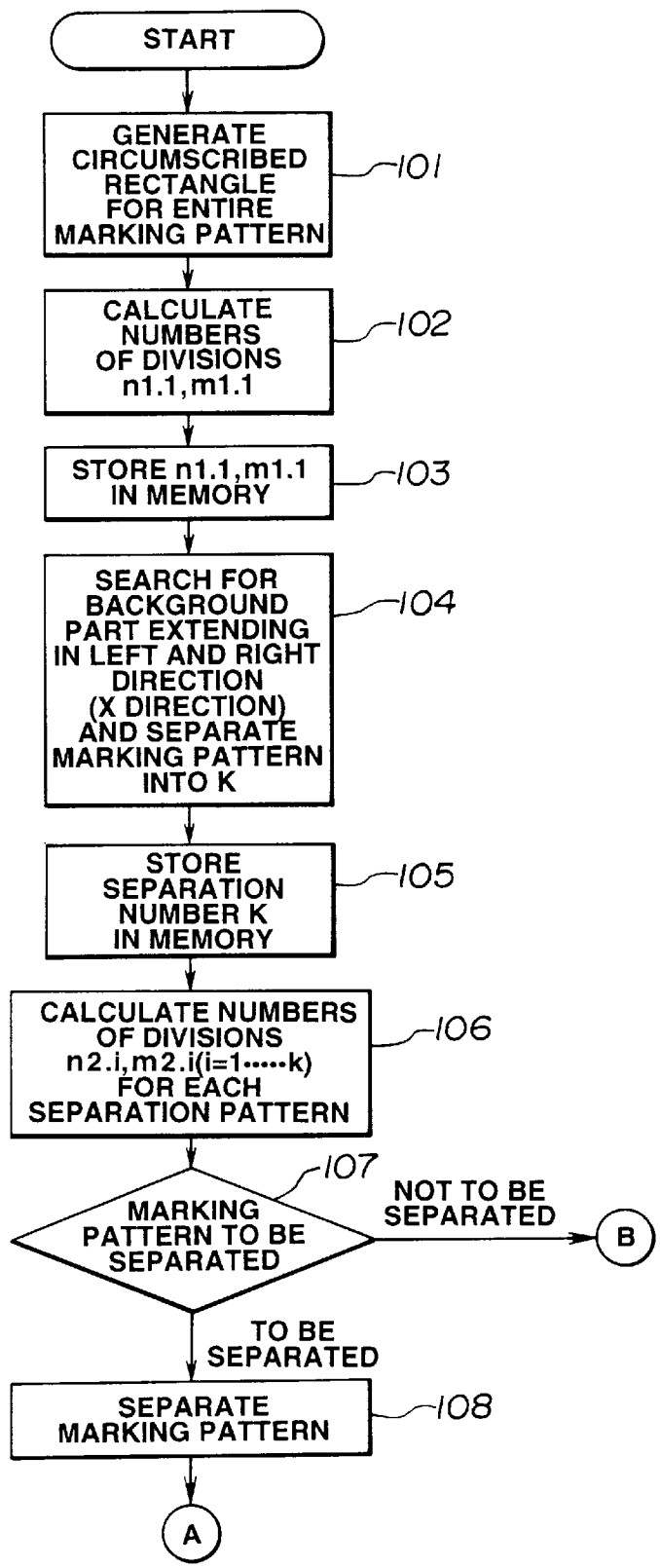
FIGS. 13(a) and 13(b) are flow charts illustrating sequences for separating the marking pattern of the original image into individual patterns and dividing the image into image segments.
Figure 13B:
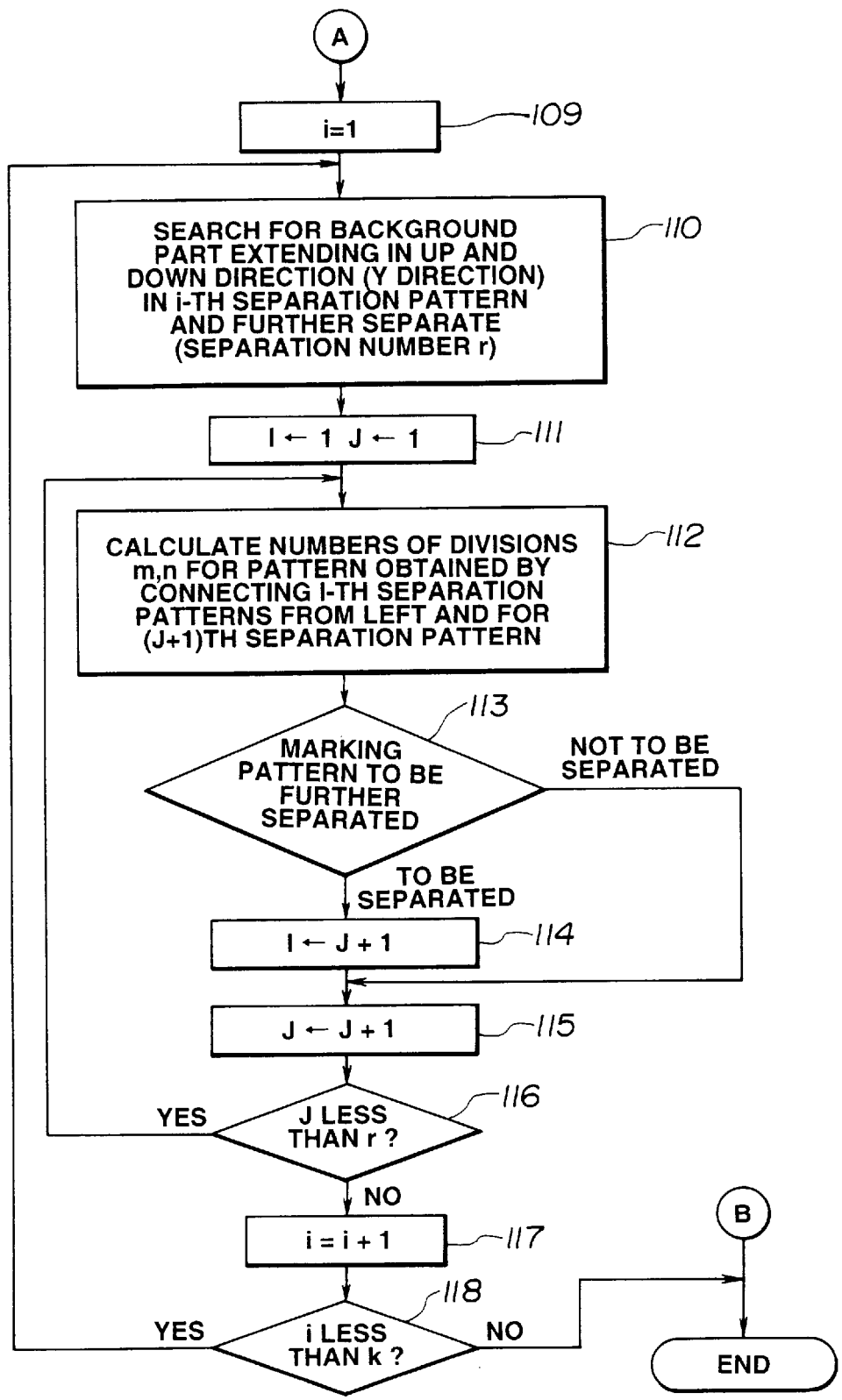

FIG. 13 is a flow chart which illustrates the manner in which the "ABCDE" marking pattern shown in FIG. 2 is separated into individual patterns A, B, . . . , and which depicts the dividing procedure performed for each pattern section. A description will be given below with reference to FIGS. 6 through 12.

Specifically, as shown in FIG. 13(a), the same procedure as that in FIG. 14 above is first performed, a rectangle 20 (see FIG. 3) circumscribing the entire marking pattern is formed (Step 101), and the numbers of divisions n1,1 and m1,1 for the circumscribed area image 21 that corresponds to the circumscribed rectangle 20 are calculated using Relation 1 above (see FIG. 4; Step 102). These numbers of divisions n1,1 and m1,1 are stored in a memory (Step 103).

Figure 6:
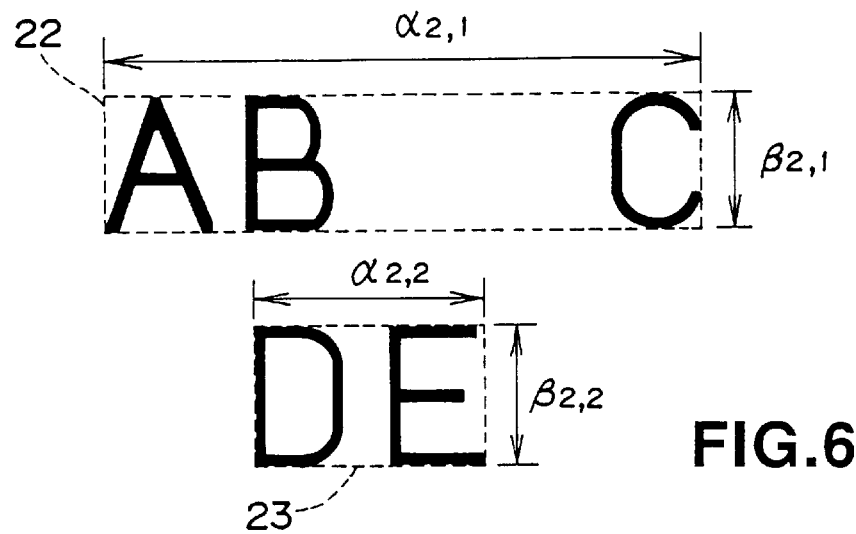
FIG. 6 is a diagram illustrating the circumscribed rectangles obtained when the marking pattern of FIG. 3 was further separated.

Each row of the image 21 is then analyzed to determine whether or not all the pixels in these rows are logical "0"s, a background segment 21a, which is a space between the upper and lower patterns and which extends in the horizontal direction (X direction), is thus identified (see FIG. 4), and this background segment 21a allows the "ABCDE" marking pattern to be separated into k (in this case, two) patterns, "ABC" and "DE" (see FIG. 6; Step 104). The pattern separation number k is stored in the memory (Step 105).

Figure 7:
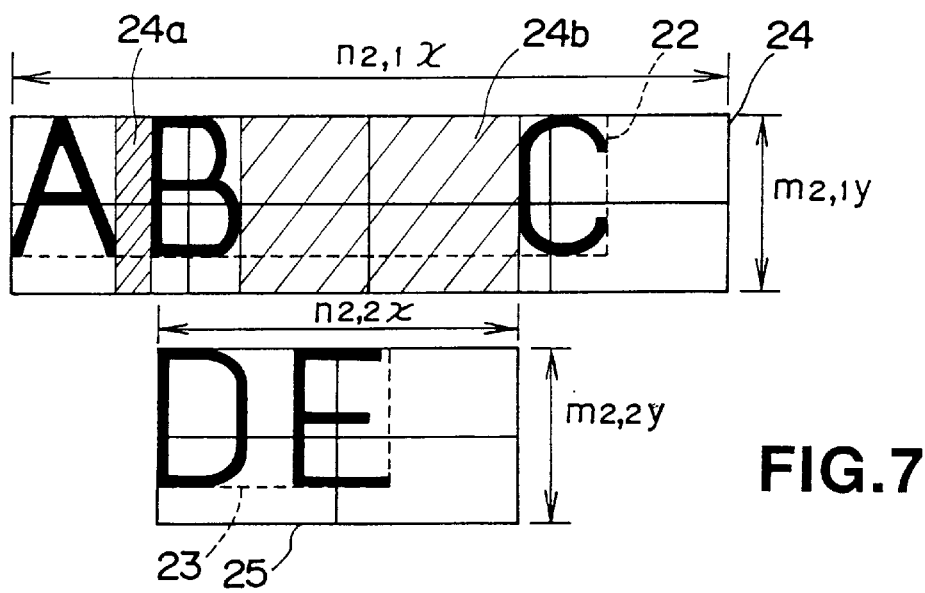
FIG. 7 is a diagram illustrating the circumscribed area images that conform to the circumscribed rectangles of FIG. 6.
Figure 8:
FIG. 8 is a diagram illustrating the manner in which the marking pattern is separated into the smallest units.

The procedure of FIG. 14 above is then performed for each separate "ABC" or "DE" pattern, a rectangular image 22 circumscribing the separate "ABC" pattern is formed, a rectangular image 23 circumscribing the separate "DE" pattern is formed (see FIG. 6), and the numbers of divisions n2,1, m2,1 and n2,2, m2,2 for circumscribed area images 24 and 25, which correspond to the circumscribed rectangles 22 and 23, respectively, are calculated using Relation 1 above (see FIG. 7; Step 106).

It is determined at this point whether or not the aforementioned separation should be performed. The following determination criterion is used in this case: a comparison is made between the numbers of divisions n1,1 and m1,1 obtained by dividing into the image segments 19 the area image 21 circumscribing the entire "ABCDE" pattern prior to separation, and the combined value of the numbers of divisions n2,1, m2,1 and n2,2, m2,2 obtained when the area images 24 and 25 circumscribing the separate "ABC" and "DE" patterns are divided into the corresponding image segments 19, and the decision to perform the separation is made only when the combined value of the numbers of divisions after separation is lower than the number of divisions before separation. Further separation is meaningless because the number of divisions is not changed as a result of separation.

Generally, Relation 2 below can be adopted as a criterion for deciding whether or not to perform division when separation into k patterns is possible.

$$n1,1 \times m1,1 - p > \sum_{i=1}^{k} (n2, i \times m2, i) \qquad (2)$$

In the formula, p is the number of image segments 19 accounted for by background segments only (for example, the three lower right image segments correspond to this number in the case of the images 21 in FIG. 4) (Step 107).

If the above equation (2) is satisfied, the corresponding separation is adopted (Step 108), and if not satisfied, no separation is adopted, it is assumed that further separation is impossible, and a decision is made to ultimately adopt the image of FIG. 4.

If the separation is adopted, a further separation in the horizontal direction is performed for each of the pattern sections i (i=1 . . . k).

In a specific case of the "ABC" pattern section, it is determined whether or not all the pixels in each column of a circumscribed area image 24 are logical "0"s, thus identifying background segments 24a and 24b, which are spaces between the left and right halves of the pattern and which extend in the vertical direction (Y direction) (see FIG. 7). These background segments 24a and 24b separate the "ABC" pattern section into r (in this case, three) patterns A, B, and C (see FIG. 8; Step 110).

At this point, I and J are each initialized to one (Step 111), and the corresponding numbers of divisions n and m are calculated for a pattern obtained by connecting together the I-th to J-th pattern sections in the direction from left to right, as well as for the (J+1)-th pattern section (Step 112). It is then determined whether or not the aforementioned separation is appropriate, using the same procedure as in Step 107 above (Step 113).

The numbers of divisions for the corresponding circumscribed area images of the "A" and "B" patterns are first calculated, and it is determined whether or not the "AB" pattern should be separated from the "A" pattern and the "B" pattern, using the aforementioned Relation 2 in the same manner.

I and J are subsequently updated (Steps 114 and 115), the "A" and "B" patterns not to be separated are re-merged, and it is determined whether to separate this "AB" pattern from the adjacent "C" pattern on the right. If the separation is to be performed, the right side pattern of the pattern sections involved is adopted as the left border, and it is determined in the same manner whether to perform separation from the adjacent pattern on the right. This procedure is repeated (r−1) times.

Figure 10:
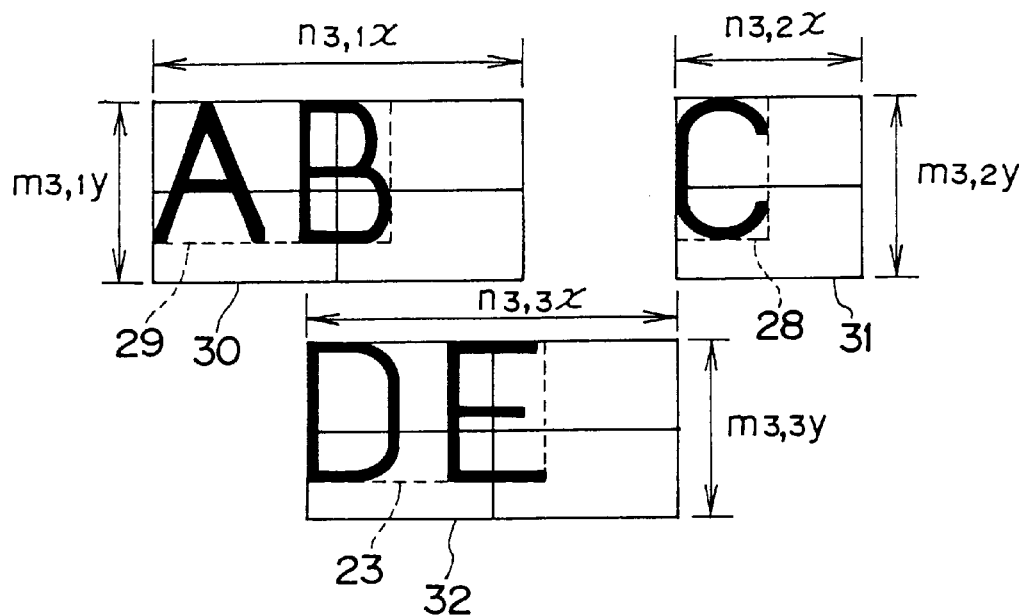
FIG. 10 is a diagram illustrating the circumscribed area images that conform to the circumscribed rectangles of FIG. 9.

It is finally determined whether the numbers of divisions n3,1 and m3,1 and the numbers of divisions n3,2 and m3,2 yield the lowest total when the merged "AB" pattern of the "A" and "B" patterns is separated from the "C" pattern (see FIG. 10; "NO" in Step 116).

Thereafter i is changed in +1 increments (Step 117), the same procedure is performed (Steps 112 through 116), it is finally determined whether the numbers of divisions n3,3 and m3,3 are at a minimum and there is no need to further separate the lower "DE" pattern section (see FIG. 10; "NO" in Step 118), and the entire procedure is completed.

Ultimately, as shown in FIG. 10, circumscribed area images 30, 31 and 32 corresponding to the circumscribed rectangles 29, 28, and 23 of the "AB," "C," and "DE" pattern sections are thus formed for each of the patterns, the image segments 19 constituting these circumscribed area images 30, 31, and 32 are sequentially retrieved, switched, and displayed, making it possible to markedly reduce the marking time by performing the minimum number of switching cycles.

Third Embodiment

Figure 11:
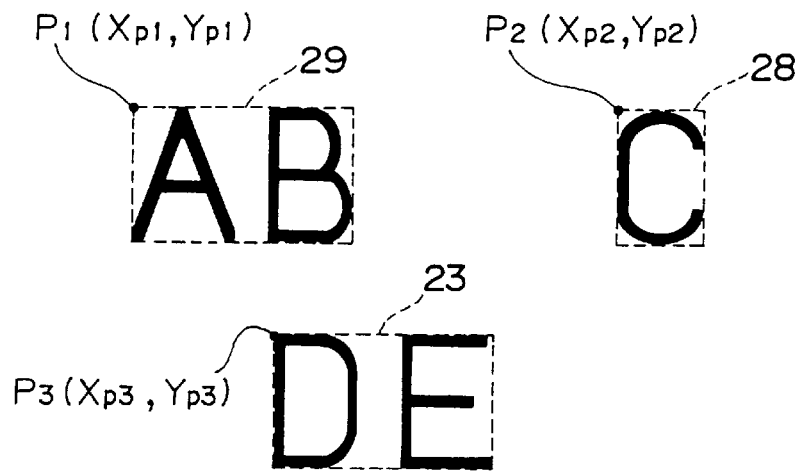
FIG. 11 is a diagram representing a positional relationship of circumscribed area images with the aid of coordinate positions.

The manner in which control is effected when a pattern separated in such a manner from the original image 18 is to be marked on the work 17 will now be described with reference to FIGS. 11 and 12.

The purpose of this control is to perform marking in such a way that the positional relationship between the circumscribed area images 30, 31, and 32 remains the same as the positional relationship of the original circumscribed area image 21 of FIG. 4, even when separated into pattern sections ("AB," "C," and "DE").

Figure 9:
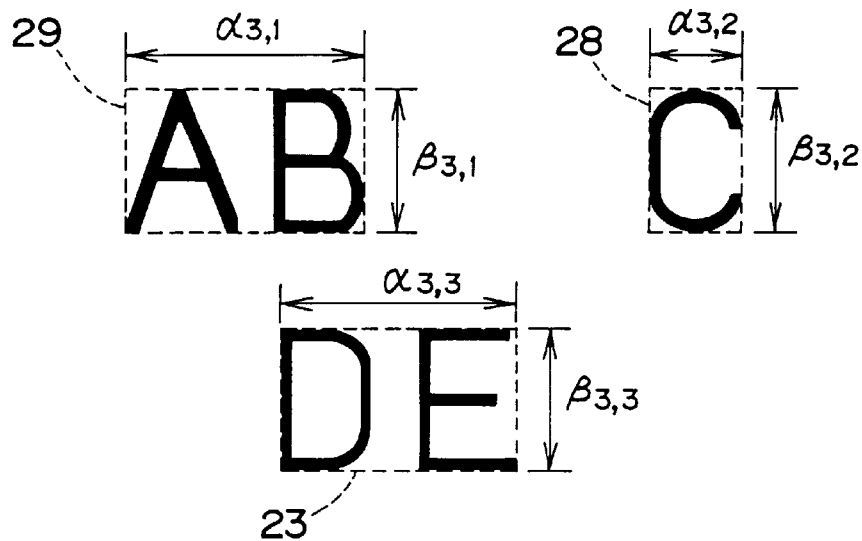
FIG. 9 is a diagram illustrating the manner in which the marking pattern shown in FIG. 3 is ultimately separated into circumscribed rectangles.

First, all the lines of the original image 18 in FIG. 2 are scanned during the aforementioned procedure to separate the circumscribed rectangles 29, 28, and 23 from the original image 18, as shown in FIG. 9. The coordinate positions P1 (Xp1, Yp1), P2 (Xp2, Yp2), and P3 (Xp3, Yp3) that the upper left vertices of the circumscribed rectangles 29, 28, and 23 occupy on the original image 18 can be individually calculated in the scanning process, as shown in FIG. 11. In this embodiment, Yp1=Yp2.

It is possible in the aforementioned process of separation and division to calculate the dimensions ($\alpha$3,1, $\beta$3,1), ($\alpha$3,2, $\beta$3,2), and ($\alpha$3,3, $\beta$3,3) of the corresponding circumscribed rectangles 29, 28, and 23 as shown in FIG. 9, to calculate the numbers of divisions (n3,1, m3,1), (n3,2, m3,2), and (n3,3, m3,3) for the corresponding circumscribed area images 30, 31, and 32 as shown in FIG. 10, and to calculate the positional coordinates P1,1 (Xp1,1, Yp1,1), P1,2 (Xp1,2, Yp1,2), . . . in the upper left vertices for each of the corresponding image segments 19 as shown in FIG. 12 from these numbers of divisions and from the dimensions (x, y) of the image segments 19 shown in FIG. 5.

When the coordinate positions P1,1, . . . of the corresponding image segments 19 are thus calculated, the drive amounts of the motors 12 and 16 for marking the pattern of each image segment 19 at the corresponding position 17a on the work 17 are calculated for each of the image segments 19 on the basis of these coordinate positions. The amount of drive may be calculated following the completion of the aforementioned separation and division procedures (FIG. 13) or in the process of performing these separation and division procedures.

It is assumed that the motors 12 and 16 of the device in FIG. 1 are at their origins when the center of the image displayed on the liquid-crystal mask is projected vertically on the work 17 from the axis of rotation of the mirror 11, and that the projection point P is the origin of the XY coordinates on the work 17.

In addition, the magnification of the lens 13 is designated "s," and the magnification of the lens 14 is designated "t."

Figure 30A:
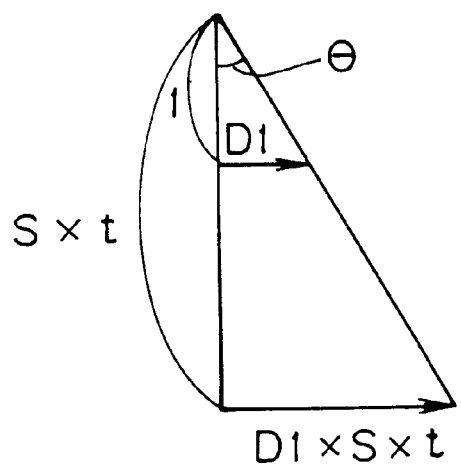
FIGS. 30(a) and 30(b) are diagrams used to describe the amounts of motor drive for the device of the embodiment.

In this case, when the motor 12 is rotated by an angle $\theta$, the image displayed on the liquid-crystal mask will travel a distance of (D1×s×t) across the work 17 in the presence of the lenses 13 and 14, assuming that the distance traveled across the work 17 is D1 in the absence of the lenses 13 and 14 (see FIG. 30(a)).

Because D1=tan$\theta$ in this case, the point Yp on the work 17 will be expressed as Yp=s×t×tan$\theta$.

Specifically, once the motor 12 is driven over a distance of ($\theta$p1,2Y–$\theta$p1,1Y) in such a way that the equation $$Yp1,2-Yp1,1=s \times t \times (\tan\theta p1,2Y - \tan\theta p1,1Y)$$

is satisfied after marking has been started at the point P1,1 of FIG. 12 and marking of one image section of the liquid-crystal mask 6 has been completed, the subsequent marking cycle is performed for an image segment 19 of the upper left vertex P1,2 adjacent in the positive direction of the Y.

When the motor 16 is driven, the table 15 and the lens 14 are driven via a link 16a.

The position x of the table 15 and the lens 14 is $$x = Lk \cdot \tan\theta x$$

where Lk is the length of the link 16a and $\theta$x is the angle of rotation of the motor 16.

Figure 30B:
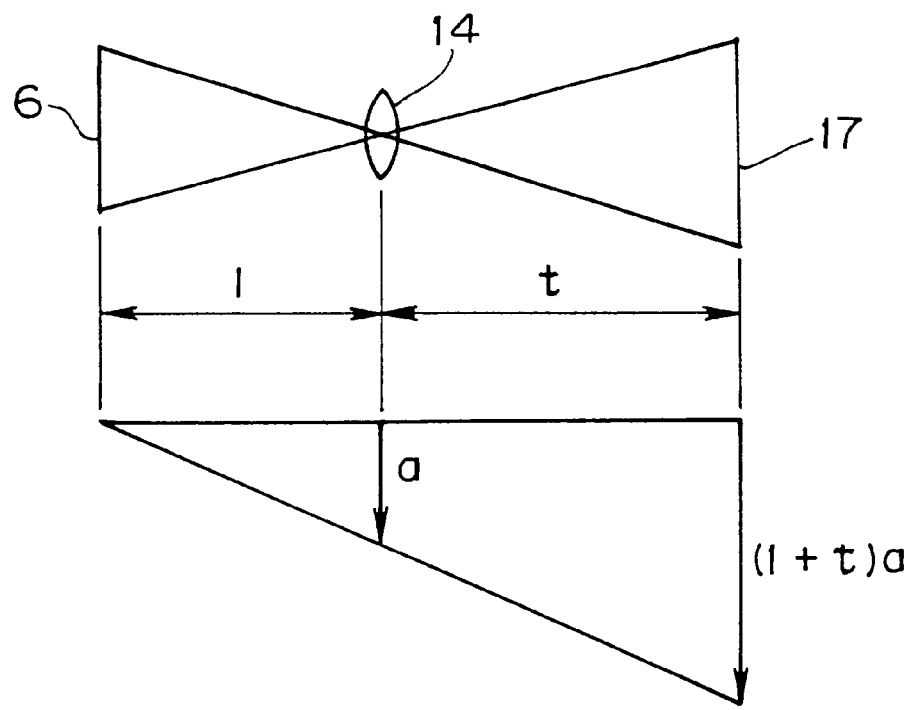

The image displayed on the liquid-crystal mask travels a distance of (1+t)a across the work 17 when the lens 14 has traveled a distance a (see FIG. 30(b)).

At this time, the image movement is unrelated to the magnifying power of the lens 13.

Specifically, to mark the upper left vertex P1,4 following the marking of the upper left vertex P1,2 in FIG. 12, the motor 16 should be driven over a distance of $\theta$p1,3x–$\theta$p1,2x in such a way that the equation $$Xp,1,3-Xp1,4 = (1+t) \times Lk \times (\tan\theta p1,3x - \tan\theta p1,2x)$$

is satisfied.

The amounts of drive are subsequently calculated in the same manner, the pattern of each image segment 19 is successively marked, and the entire "ABCDE" pattern is ultimately marked on the work 17 in the same positional relationship as the positional relationship shown for the image 21 of FIG. 4 (original image 18 of FIG. 2).

It is also possible to calculate the amount of drive in the same manner and to mark the entire pattern when a structure is adopted in which the mirror 11 in FIG. 1 is fixed and the moving lens 14 is moved by two motors not only in the Y direction but also in the X direction.

Assuming that the origins of the motors that effect movement in the X direction and Y direction have been defined in the same manner as above, the positions occupied by the lens 14 being moved by each of the motors are designated as TX and TY. In addition, the magnification of the lens 13 is designated "u," and the magnification of the lens 14 is designated "v."

In these conditions, once the motor designed to effect movement in the X direction is driven in such a way that the equation $$Xp1,3-Xp1,1 = (1+v) \times (TXp1,3 - TXp1,1)$$

is satisfied after marking has been started at the point P1,1 of FIG. 12 and marking of one image section of the liquid-crystal mask 6 has been completed, the subsequent marking cycle is performed for the image segment 19 of the upper left vertex P1,3 in the positive direction of the X. The amount of drive is thus calculated, and a subsequent new image segment 19 is marked.

The motor designed to effect movement in the X direction and the motor designed to effect movement in the Y direction should subsequently be driven in the same manner in such a way that the equations $$Xp1,2-Xp1,3=(1+v)\times(TXp1,2-TXp1,3)$$

$$Yp1,2-Yp1,3=(1+v)\times(TYp1,2-TYp1,3)$$

are satisfied in order to perform the next cycle of marking for an image segment 19 with the upper left vertex P1,2.

The amounts of drive are subsequently calculated in the same manner, the pattern of each image segment 19 is successively marked, and the entire "ABCDE" pattern is ultimately marked on the work 17 in the same positional relationship as the positional relationship shown for the image 21 of FIG. 4 (original image 18 of FIG. 2). The third embodiment thus allows the patterns of the circumscribed area images 30, 31, and 32 separated from the original image 18 to be accurately marked on the work 17 in the same positional relationship as that for the entire pattern of the original image 18.

Fourth Embodiment

An embodiment that allows the display screen 10 of the liquid-crystal mask 6 to be scanned in a short time will now be described with reference to FIGS. 15 through 19.

As shown in FIG. 15, this embodiment involves rotating the drive motor 8 of the scanning mirror 2 at a constant speed all the time and performing sub scanning at a constant velocity ve while the mirror 2 performs the sub scanning of the display screen 10 in the Y direction.

Figure 16:
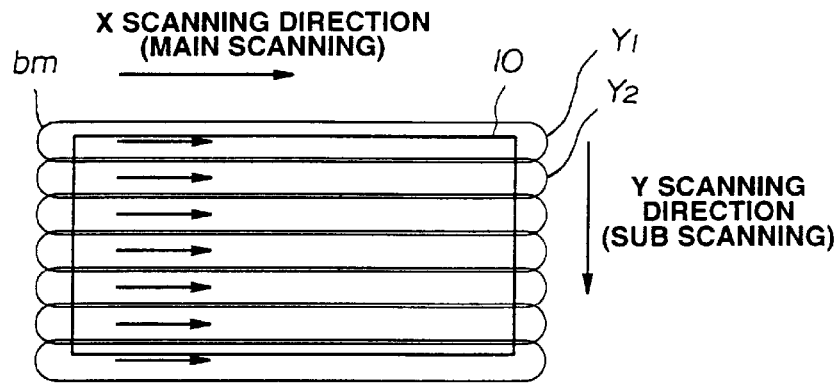
FIG. 16 is a diagram illustrating a conventional mode for scanning the display screen of a liquid-display mask.

With a conventional stepwise scanning mode, as shown in FIG. 16, when a single cycle of main scanning in the X direction has been completed, the speed of the motor 8 is changed in steps from zero speed to a predetermined speed designed to effect a transfer from its sub-scanning position Y1 to the sub-scanning position Y2 of a next main scanning and the mirror 2 is displaced by a small angle. A disadvantage of this stepwise mode, however, is that as the rotational speed of the polygonal mirror 3 is increased, that is, the main-scanning speed is increased, the tracking of the main scanning is impaired, and vibration occurs. The constant-speed main scanning used in this embodiment makes it possible to overcome such tracking impairment and other shortcomings and to ensure that the main scanning speed is raised, that is, the marking time is reduced, without impairing tracking or causing other undesirable consequences.

As the sub scanning speed becomes uniform, the laser beam bm scans the display screen 10 diagonally, as shown in FIG. 15, but this does not affect quality.

The sub scanning speed ve, that is, the speed of the motor 8 for the rotation of the mirror 2, is given by Equation (3) below $$ve=2\omega L/5h \tag{3}$$

where L is the required drive displacement for the scanning mirror 3 to perform the sub scanning of the entire liquid-crystal screen 10 (see FIG. 17), ω (rad/min) is the angular rotational speed of the polygonal mirror 3, and h is the number of cycles of main scanning per screen.

Here, the unit of speed ve is equal to the unit of drive displacement L divided by second.

The aforementioned Equation (3) can be obtained in the following manner.

Figure 17:
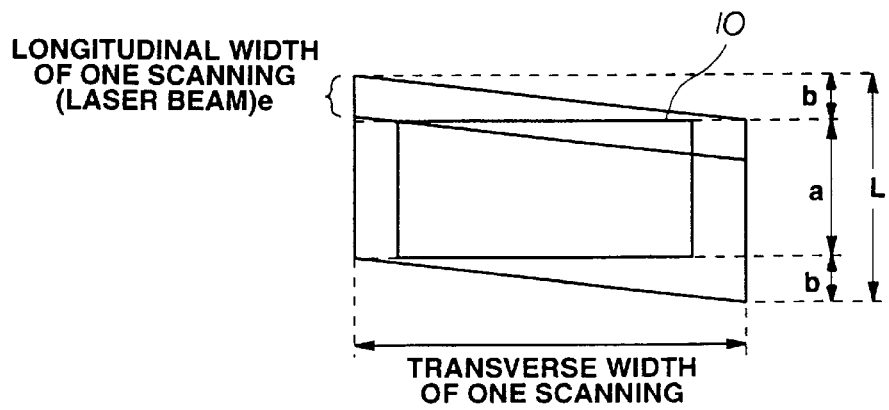
FIG. 17 is a diagram used to describe the manner in which the sub-scanning speed is computed.

Specifically, as shown in FIG. 17, the scanning mirror 2 must scan the range L of the liquid-crystal screen 10 in the direction of sub scanning to allow the laser beam to scan the entire display screen 10. In this case the scanning range L can be calculated using Equation (4) below by adding the width b of a single scanning pass to the both above and below the a longitudinal width a of the liquid crystal display 10.

$$L=a+2b \tag{4}$$

The minimum value of the range L can be smaller than the Equation (4), however, it is better to adopt a slightly large L value, taking into account energy fluctuations around the laser beam.

Since a single cycle of main scanning is performed by a side 3a of the polygonal mirror 3, the time τ(sec) needed to perform a single cycle of main scanning can be calculated using Equation (5) below as the polygonal mirror 3 has 24 sides and the rotational angular speed is ω(rad/min).

$$\tau=(60/\omega)\cdot 1/24=5/2\omega(\text{sec}) \tag{5}$$

Since the fact that the scanning range L is covered in h scanning cycles means that the distance traveled in time hτ (sec) will be equal to the range L, it follows that $$ve=L/(5/2\omega)\cdot h \tag{3)'}$$

and the aforementioned Equation (3) results.

Equation (6) below can be obtained by generalizing the aforementioned Equation (3) and assuming that the polygonal mirror 3 has c sides.

$$ve=c\omega L/60h \tag{6}$$

As a deflector, a member other than the polygonal mirror may be used. In this case as well, the sub scanning speed ve can be calculated basically if the following parameters are known: the required time τ for a single cycle of main scanning, the number of times h the display screen 10 undergoes main scanning, and the longitudinal width a, which is the length of the display screen 10 in the sub scanning direction Y.

The required number of scanning cycles for scanning the aforementioned range L can be calculated using Equation (7) below on the basis of the diameter e of the laser beam striking the liquid-crystal screen.

$$h\geq L/e \tag{7}$$

Gaps form between scans when the displacement of the scanning mirror 2 exceeds the diameter e of the laser beam during the scanning of the side 3a of the polygonal mirror 3, so Equation (8) below is obtained for a speed ve that ensures scanning without gaps.

$$ve\tau\leq e, \text{ that is, } ve\cdot(60/\omega c)\leq e, \text{ that is, } ve\leq c\omega e/60 \tag{8}$$

When the speed ve is computed in such a manner, the controller 7 drives the motors 8 and 9 in controlled fashion in such a way that, as shown in FIG. 18, scanning begins at the starting position St, and the laser beam bm scans the screen 10 in the direction of the arrow at the sub-scanning speed ve.

When the drive motor 8 of the scanning mirror 2 is driven in controlled fashion, it is easy from the standpoint of control to return to the scan starting position St after the pattern of one screen has been completely marked, and to repeat the scanning from the scan starting position St in the same manner with the aid of mark starting signals for a next one screen.

The effect of this embodiment will now be described. As shown in FIG. 19, the aforementioned conventional stepwise scanning mode involves reading the switching period for the side 3a of the polygonal mirror 3 with a sensor, synchronizing the corresponding mirror surface switching signal (FIG. 19(a)) with a scan mirror drive signal (FIG. 19(b)) for positioning the mirror 2 at the next sub-scanning position, and performing sub scanning.

For this reason, an increase in the rotational speed of the polygonal mirror 3 therefore reduces the time τ' between the moment the polygonal surface switching signal begins to increase and the moment the laser beam actually starts scanning the liquid-crystal screen 10 (FIG. 19(c)), and there is not enough time for the scanning mirror 2 to move to the next sub-scanning position. This means impaired tracking.

When, however, a constant-speed scanning mode such as that described above is adopted, it is not necessary to synchronize the scan mirror drive period with the polygonal-surface switching period, and it becomes possible to increase the rotational speed of the polygonal mirror without adversely affecting tracking.

The fourth embodiment thus allows the scanning speed to be increased without adversely affecting tracking or bringing about other disadvantages, and thus to reduce the marking time.

None of the aforementioned impaired tracking or other problems occur when the rotational speed of the polygonal mirror 3 is low, so the conventional stepwise scanning mode is adopted when, for example, a predetermined threshold is set for the main-scanning speed, and this main-scanning speed does not exceed this threshold. The constant-speed scanning mode of the fourth embodiment can also be implemented when the main-scanning speed exceeds the aforementioned threshold.

Fifth Embodiment

Figure 23:
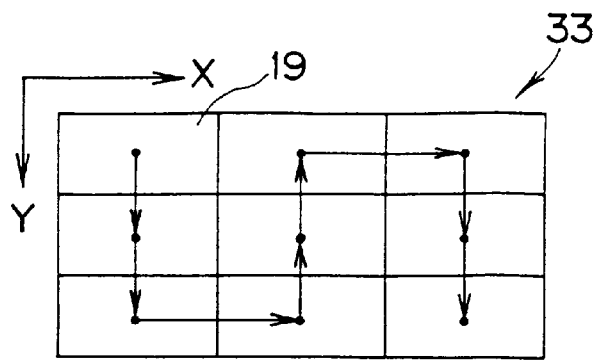
FIG. 23 is a diagram illustrating the manner in which a display switching procedure characterized by the maximum travel in the X direction is performed.

As shown in FIG. 23, when a procedure is performed in which an entire image 33 is divided into a plurality of image segments 19, the plurality of the image segments 19 is sequentially displayed on a liquid-crystal mask 6, and the patterns of the image segments 19 are sequentially marked in the corresponding areas 17a of the work 17 with the aid of motors 12 and 16. It is possible to reduce the marking time by setting an appropriate sequence for the display switching sequence of the image segments 19 in the process.

The following four operations are needed to switch the display of the image segments 19 in the device of FIG. 1.

(a) Switching of the screen of the liquid-crystal mask 6
(b) Shifting of exposure position 17a in the X direction by the motor 16
(c) Shifting of exposure position 17a in the Y direction by the motor 12
(d) Shifting of the scanning mirror 2 into the scan starting position St These are represented in FIGS. 20(a) through 22(d) as the screen switching time τa of the liquid-crystal mask, the travel time τb in the X direction, the travel time τc in the Y direction, and the preparation time τd for sub scanning. The time required to perform the switching is determined by the longest of these times.

Figure 24:
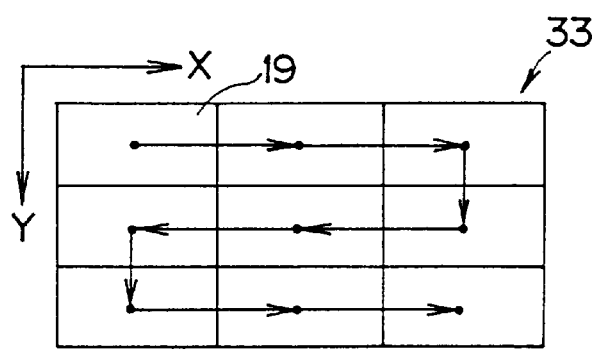
FIG. 24 is a diagram illustrating the manner in which a display switching procedure characterized by the minimum travel in the Y direction is performed.
Figure 25:
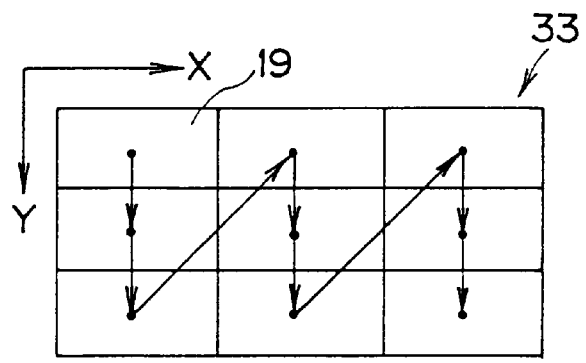
FIG. 25 is a diagram illustrating the manner in which a display switching procedure that includes travel in a diagonal direction is performed.

In FIG. 20, where the screen switching time τa of the liquid-crystal mask is the longest, the switching operation time is always equal to the screen switching time τa and does not change even when any of the routes shown by the arrows in FIGS. 23 and 24 are selected as the display switching sequences (marking sequences) for the image segments 19.

When, however, the times τa through τd are compared, and the travel time τb in the X direction or the travel time τc in the Y direction is the longest, as shown in FIG. 21 (which illustrates a case in which the travel time τb in the X direction is the longest), the marking time can be reduced by setting to either a marking procedure with the maximum number of travel cycles in the travel direction (Y direction) of shorter duration (the shorter of the two travel times τb and τc) or a marking procedure with the minimum number of travel cycles in the travel direction (X direction) of longer duration (the longer of the two travel times τb and τc).

In this case, the marking time is reduced to a minimum by setting the marking sequence of FIG. 23, in which the travel in the X direction is reduced to a minimum (two cycles).

Of the times τb and τc, at least one must be longer than the screen switching time τa, although it is permissible for one of them to be shorter than the screen switching time τa.

The fifth embodiment is implemented in view of the fact that image segments 19 sometimes have different longitudinal and transverse dimensions and that, accordingly, the time needed for an exposure position to travel across a work 17 is different for the X and Y directions.

Sixth Embodiment

Next, reducing the preparation time τd for sub scanning is effective for reducing the marking time when the result of comparing times τa through τd is that the preparation time τd for sub scanning is longer than both the time τa and at least one of the travel times τa and τb in the X and Y directions. A further time reduction can be attained in this case by selecting a rapid marking sequence in combination with the aforementioned fifth embodiment.

Figure 26A:
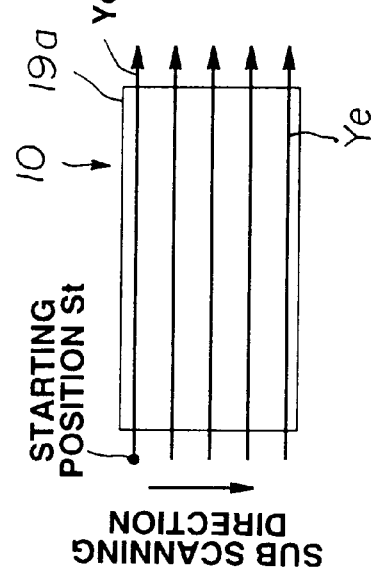
FIGS. 26(a) to 26(c) are diagrams illustrating a scanning sequence capable of minimizing the preparation time for sub scanning.

Generally, continuous scanning of a switching screen involves using as the origin a preset sub-scanning position Y0 for a display screen 10 and repeatedly performing scanning from this origin, as shown in FIG. 26(a), but in this embodiment the sub-scanning position Ye reached when the entire scanning of one screen 19a has been completed serves as the sub-scanning position for the origin of the next screen 19b, and scanning is started from this sub-scanning position.

Figure 26B:
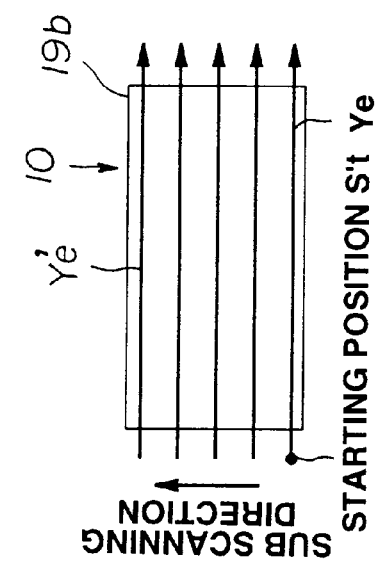
Figure 26C:
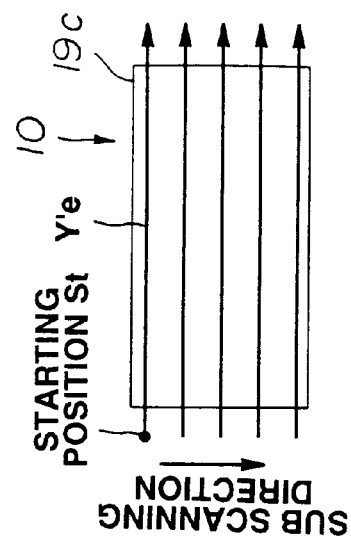

Specifically, the first sub-scanning position Y0 is defined as the origin for the first screen 19a; scanning is performed from the starting position St (FIG. 26(a)); the last sub-scanning position Ye, which is reached when the entire scanning of the screen 19a has been completed, is defined as the origin; scanning of the next screen 19b is started from a starting position St'; and sub scanning is performed in a reverse direction with respect to the previous screen 19a (FIG. 26(b)). The last sub-scanning position Ye' (=Y0), which is reached when the entire scanning of the screen 19b has been completed, is defined as the origin; scanning of the next screen 19c is started from the starting position St; and sub scanning is performed in a reverse direction with respect to the previous screen 19b (FIG. 26(c)).

In this manner, the time τd required for the sub scanning is reduced, and thus the marking time can be reduced.

Seventh Embodiment

Figure 28:
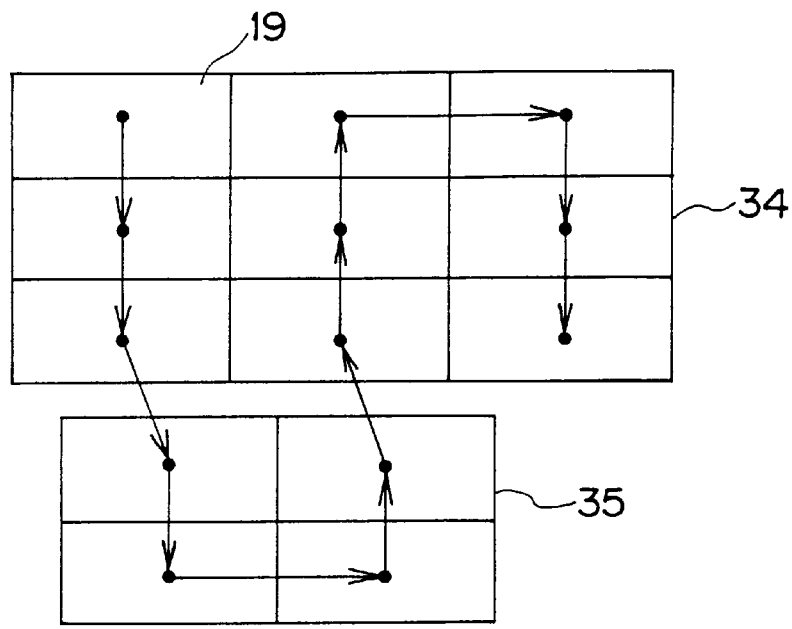
FIG. 28 is a diagram illustrating a display switching pattern involving performing at least two travel cycles alternating between two images.
Figure 29:
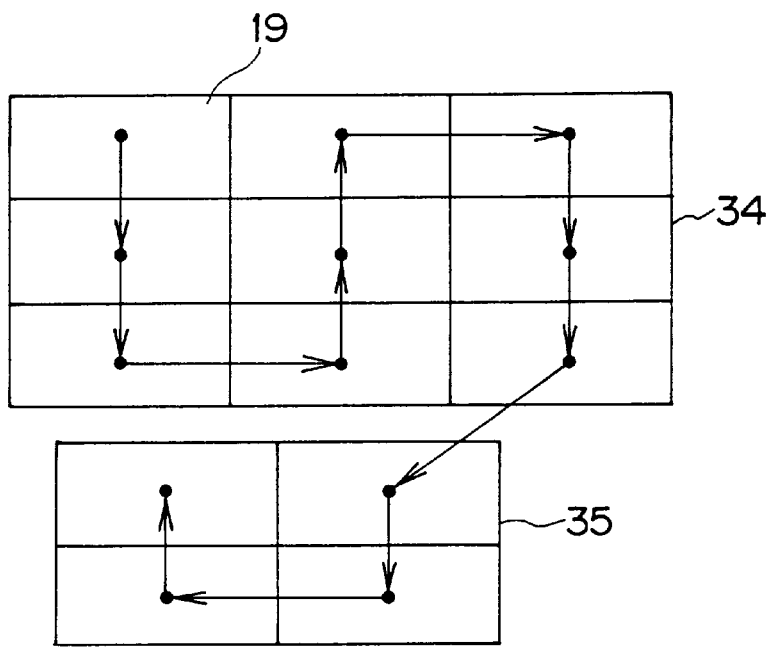
FIG. 29 is a diagram illustrating a display pattern in which the one image is switched after the entire display of the other one image is completed.

When several images are retrieved in a manner such as that described above from an original image 18 for each pattern section, the following two patterns may be adopted as the display switching sequences (marking sequences) for the image segments 19 that make up these images 34 and 35, as shown in FIGS. 28 and 29.

One is a switching pattern in which at least two cycles of display switching are alternately performed between one image 34 and the other image 35, and the other is a switching pattern in which all the display switching operations for one image (for example, image 34) are completed, and the operation then proceeds to the display switching procedure for the other image (image 35).

The marking time can therefore be reduced by selecting that of the two available switching patterns which allows marking to be performed in a short time.

Figure 27:
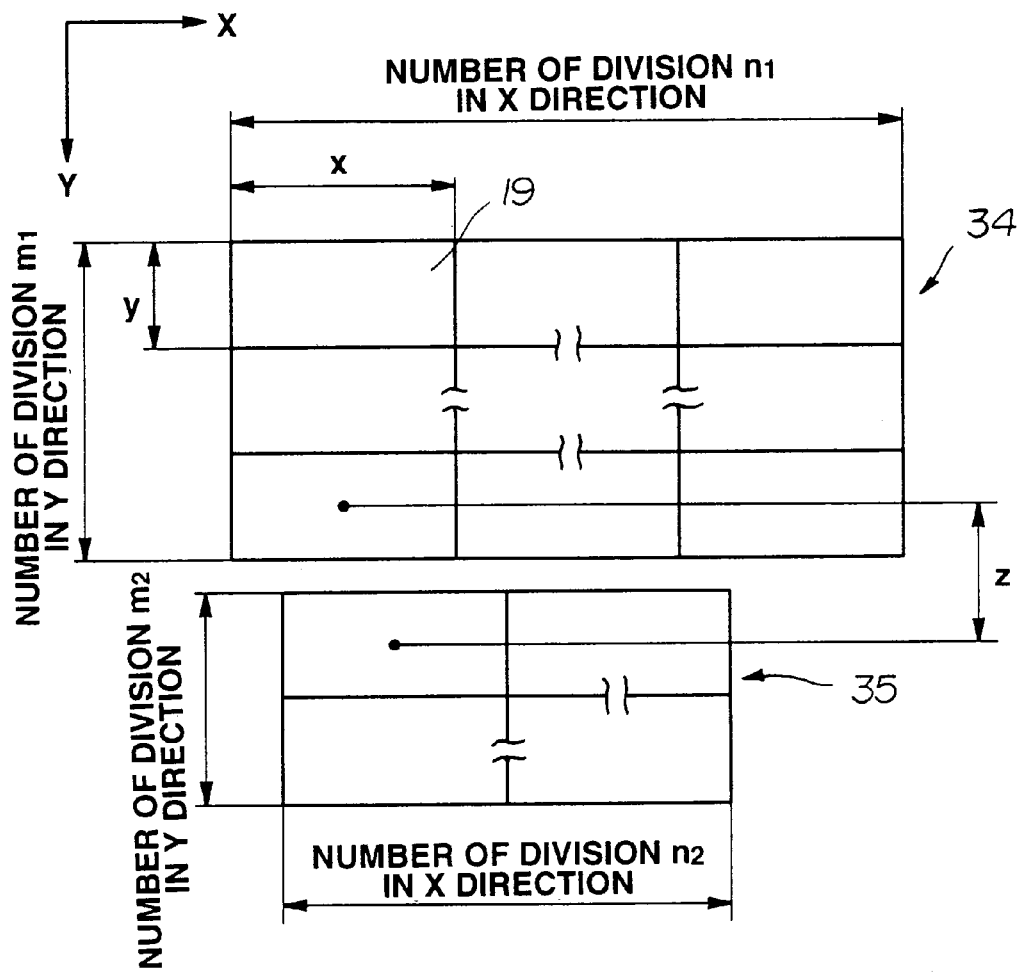
FIG. 27 is a diagram illustrating the positional relationship between two images.

It is now assumed that, as shown in FIG. 27, the number of divisions of the image 34 in the X direction is n1, the number of divisions in the Y direction is m1, the number of divisions of the image 35 in the X direction is n2, the number of divisions in the Y direction is m2, and the distance between the image 34 and the image 35 in the clearance direction (Y) is z. In addition, the travel distance (transverse width of the image segment 19) per cycle in the X direction is x, and the travel distance (longitudinal width of the image segment 19) per cycle in the Y direction is y. The aforementioned clearance distance z can be calculated based on the coordinate positions of the images 34 and 35.

First, the total travel distance is computed for the switching pattern of FIG. 28.

Specifically, the total number of travel cycles in the Y direction for the images 34 and 35 is expressed by Equation (9) below.

$$n1(m1-1)+n2(m2-1) \qquad (9)$$

The total travel distance in the Y direction will therefore be as follows.

$$\{n1(m1-1)+n2(m2-1)\}y \qquad (10)$$

Meanwhile, the total number of travel cycles in the X direction is expressed as $$n\ max-1 \qquad (11)$$

where n max (=n1) is the largest of the numbers of divisions n1 and n2 for the images 34 and 35 in the X direction, and the total travel distance in the X direction is expressed by the following equation.

$$(n\ max-1)x \qquad (12)$$

In addition, the number of travel cycles involved in traveling between the images 34 and 35 is n min, where n min (=n2) is the smaller of the numbers of divisions n1 and n2 for the images 34 and 35 in the X direction, and the total travel distance between the images is calculated as $$n\ min \cdot z \qquad (13)$$

In view of the above, the total travel distance D for this switching pattern can be calculated using the following equation.

$$D=\{n1(m1-1)+n2(m2-1)\}y+(n\ max-1)x+n\ min \cdot z \qquad (14)$$

Apparently, the total travel distance D' for the switching pattern of FIG. 29 can then be expressed as the following Equation (15) on the basis of the aforementioned equations.

$$D'=\{n1(m1-1)+n2(m2-1)\}y+\{(n1-1)+(n2-1)\}x+z \qquad (15)$$

The travel time for each pattern can therefore be computed once the travel times for the travel distances x, y, and z are set. As a result, selecting the pattern with the shortest time of the two switching patterns and sequentially performing display switching and marking makes it possible to always obtain the shortest marking time for any positional relationship between the images 34 and 35.

The amount by which the motors 12 and 16 should be driven in order to sequentially mark the work 17 with the patterns of the image segments 19 of the images 34 and 35 can be calculated in the same manner as in the third embodiment described above.

Any combination of the first through seventh embodiments described above can also be implemented.

The embodiments were described using an example in which the scanning mode involved exposing a liquid-crystal mask to light, but these embodiments can also be used in the same manner when a one-shot exposure mode is adopted.

INDUSTRIAL APPLICABILITY

As described above, the present invention involves reducing the numbers of divisions when an original image is divided into image segments, and thus allows the marking time to be reduced.

Furthermore, when the display screen of the mask undergoes sub scanning, this sub scanning is performed at a constant speed, and so the marking time can be reduced without impairing tracking properties or bringing about other disadvantages.

Moreover, the marking time can be reduced because the shortest display switching sequence is determined.

In addition, the marking time can be reduced because measures are taken to reduce the preparation time of sub scanning.

I claim:

1. A control device of a marking device comprising dividing process means for receiving and dividing data of an original image (18) into a plurality of divided images (19), display means for performing sequential switching display of each divided image (19) on a display screen (10) of a liquid-crystal mask (6), drive control means for driving and controlling actuators (12, 16) so as to change to a corresponding irradiation position (17a) on a work (17) each time switching display of the divided image (19) is performed to thereby mark a pattern (ABCDE) of the original image (18) on the work (17), the dividing process means being constructed and arranged for sequentially scanning each line of the original image (18) and judging for each line whether all pixels are a logical "0" corresponding to a "background" or are a logical "1" corresponding to a "pattern" thereby determining a minimum rectangle that circumscribes the pattern (ABCDE) or respective minimum rectangles (22, 23); (29, 28, 23), respectively, that circumscribe respective patterns (ABC), (DE); (AB), (C) and (DE), respectively, which are separated patterns of the pattern (ABCDE) and to determine coordinate positions (P1, P2 and P3) of the circumscribed minimum rectangles (22, 23); (29, 28, 23), respectively, on the original image (18) thereby generating the divided image (19) only for the circumscribed minimum rectangles (22, 23); (29, 28, 23), respectively, (FIGS. 6, 7, 9–11), the display means displays in the sequentially changing manner the divided image (19) generated only for the circumscribed minimum rectangles (22, 23); (29, 28, 23), respectively, on the display screen (10) of the liquid-crystal mask (6), and the drive control means, on the basis of the coordinate positions (P1, P2 and P3) of the circumscribed minimum rectangles (22, 23); (29, 28, 23), respectively, on the original image (18) drives and controls the actuators (12, 16) so as to change to the corresponding irradiation position (17a) on the work (17) each time switching display of the divided image (19) is performed to thereby mark the pattern (ABCDE) of the original image (18) on the work (17).

2. A control device of a marking device as defined in claim 1, wherein the original image and the circumscribed area image are both rectangles, and a number of divisions (n×m) for dividing the circumscribed area image into the plurality of image segments is given by minimum natural numbers n and m that satisfy the relations $\alpha \leq nx$ $\beta \leq my$ where x is a length in a transverse direction and y is a length in a longitudinal direction of the image segments, $\alpha$ is a length in the transverse direction and $\beta$ is a length in the longitudinal direction of the circumscribed area image.

3. A control device of a marking device as defined in claim 1, wherein numbers of divisions are obtained by dividing the circumscribed area image of an entire pattern before the marking pattern is divided into individual patterns are compared with a total sum of the numbers of divisions obtained by dividing circumscribed area images of separated pattern sections, and a decision is made on the basis of comparison results whether or not to subject the circumscribed area images to retrieval processing for each separated pattern section.

4. A control device of a marking device as defined in claim 1, wherein the circumscribed area images are retrieved for each separated pattern section when the pattern is separated into upper and lower halves or left and right halves on the original image.

5. A control device of a marking device as defined in claim 4, wherein the control device judges that the circumscribed area images undergo retrieval processing for each separated pattern section when $$n1,1 \times m1,1 - p > \sum_{i=1} (n2, i \times m2, i)$$

where p is the number of image segments representing only background other than the pattern among the image segments with the number of divisions n1,1×m1,1 obtained by dividing the circumscribed area image of the entire unseparated pattern, k is the number of separated pattern sections, and n2,i×m2,i (i=1, . . . , k) are numbers of divisions of the individual circumscribed area images of the separated pattern sections.

6. A control device of a marking device as defined in claim 2, wherein the circumscribed area images are retrieved for each separated pattern section when the pattern is separated into upper and lower halves or left and right halves on the original image.

* * * * *